United States Patent
Youngs et al.

(10) Patent No.: US 8,774,379 B1
(45) Date of Patent: Jul. 8, 2014

(54) INCOMING SPOOF CALL DETECTION

(75) Inventors: Simon Youngs, Overland Park, KS (US); Gary Duane Koller, Overland Park, KS (US); Mark Douglas Peden, Olathe, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 22 days.

(21) Appl. No.: 13/348,339

(22) Filed: Jan. 11, 2012

(51) Int. Cl.
*H04M 1/56* (2006.01)
*H04M 15/06* (2006.01)

(52) U.S. Cl.
USPC ............ 379/142.02; 379/142.04; 379/142.05; 379/142.06

(58) Field of Classification Search
USPC .............. 379/142.02, 142.04, 142.05, 142.06
See application file for complete search history.

(56) References Cited

U.S. PATENT DOCUMENTS

| 8,135,119 B1 * | 3/2012 | Zhao et al. | 379/142.05 |
| 2008/0159501 A1 * | 7/2008 | Cai | 379/142.05 |

* cited by examiner

*Primary Examiner* — Gerald Gauthier
*Assistant Examiner* — Simon King (57) ABSTRACT

Systems, methods, and computer-readable media, for facilitating incoming spoof call determinations are provided. In some embodiments, the method includes receiving call-setup data including a point code associated with origination of a call intended for a receiving device. The point code can be utilized to determine that the call intended for the receiving device is a spoof call. Such a spoof call can be initiated by a spoof-calling party associated with a number and is intended to provide an indication to the receiving device that the call is associated with another number.

9 Claims, 8 Drawing Sheets

FIG. 2

INCOMING SPOOF CALL DETECTION

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating detection of spoof calls being placed to a receiving device. Utilizing embodiments hereof, call-setup data, such as a point code(s), can be used to detect whether an incoming call is a spoof call. In this way, an action can be applied in association with the spoof call to block the spoof call or to provide an indication of a spoof call or a potential spoof call.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for detecting spoof calls and notifying a called device thereof. Utilizing embodiments hereof, spoof calls initiated by a spoof-calling party can be detected, for example, utilizing call-setup data. For example, a mobile device number (MDN), a mobile station identifier (MSID), and/or a point code can be used by a spoof detecting system to identify a spoof call being placed to a receiving device. Upon identifying an incoming spoof call, an indication of the suspected incoming spoof call can be provided, for example, to the called party.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| CD-ROM | Compact Disk Read Only Memory |
| CDMA | Code Division Multiple Access |
| GIS | Geographic/Geographical/Geospatial Information System |
| GPRS | General Packet Radio Service |
| GSM | Global System for Mobile communications: originally from Groupe Spécial Mobile |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| PC | Personal Computer |
| PCS | Personal Communications Service |
| PDA | Personal Digital Assistant |
| RAM | Random Access Memory |
| ROM | Read Only Memory |
| TDMA | Time Division Multiple Access |
| UMTS | Universal Mobile Telecommunications Systems |
| USB | Universal Serial Bus |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
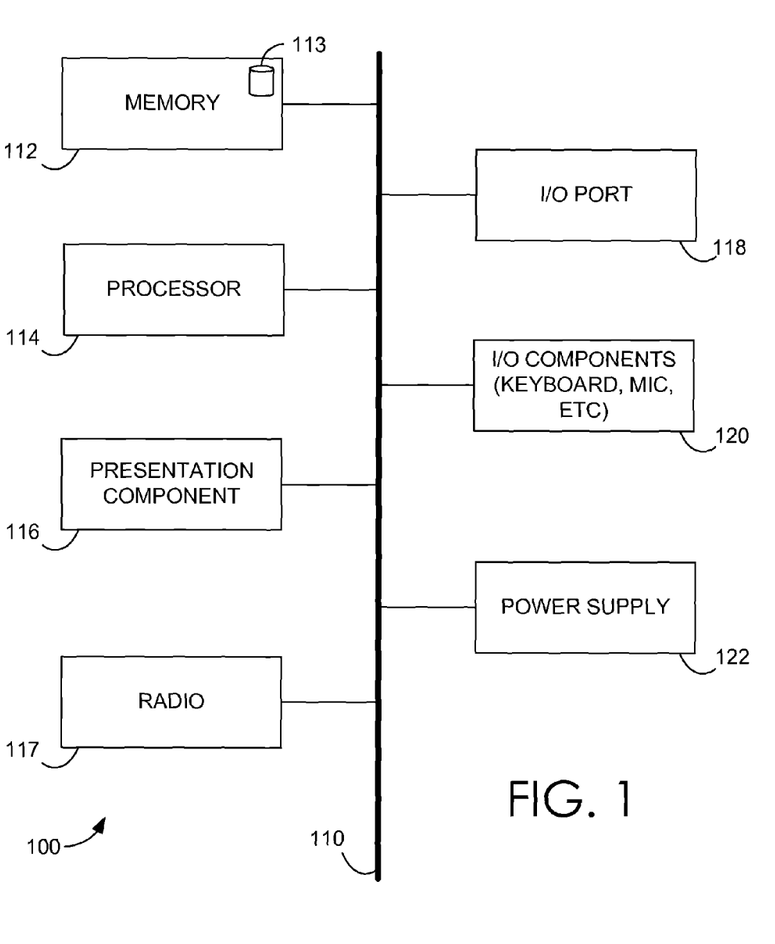
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate detecting spoof calls and initiating a spoof action in response thereto (e.g., notifying a receiving device thereof). In this regard, a spoof call being placed to a receiving or called device is recognized and, thereafter, the receiving device can be provided with an indication of the spoof call being placed thereto. A spoof call, as used herein, refers to a call initiated by a calling party that causes a telephone network to display a number on the recipient's caller ID display that is not that of the actual initiating device and/or to display a caller name on the recipient's caller ID display that is not the actual name or identifier or the caller from the initiating device. A spoof call can make a call appear to have come from any phone number and/or caller name the caller wishes. In this regard, assuming a caller ID is used on the receiving end, the called party would typically assume that the call was coming from a different phone number (i.e., the spoof number chosen by the caller) thereby tricking the called party into believe that the call was coming from a different individual or organization than the caller's. A spoof call can alternatively be called caller ID spoofing.

By way of example only, assume that a caller named "John Doe," having a device associated with the phone number of 913.555.5555, wishes to call another party "Fred Smith." Further assume that the caller John Doe, however, does not want the called party, Fred Smith, to recognize that he is the caller. Accordingly, John Doe utilizes a spoofing service that enables him to initiate a spoof call to Fred Smith. In establishing the spoof call with the spoofing service, John Doe enters the spoof name as ABC Corp. and the spoof number as 816.333.3333. Accordingly, upon the spoofing service setting up a call between John Doe's device and Fred Smith's device, the caller ID on Fred Smith's device displays "ABC Corp. 816.333.3333."

According, in one aspect, the present invention is directed to one or more computer-readable media having computer-executable instructions embodied thereon that, when executed, perform a method for facilitating incoming spoof call detection. The method includes recognizing an indication of a call intended for a receiving device; identifying that spoof call detection applies to the receiving device; and providing call-setup data, including a point code associated with origination of the call intended for the receiving device, to be utilized in detecting whether the call intended for the receiving device is a spoof call.

In another aspect, embodiments of the present invention are directed to one or more computer-readable media having computer-executable instructions embodied thereon that, when executed, perform a method for facilitating incoming spoof call determinations. The method includes receiving call-setup data including a point code associated with origination of a call intended for a receiving device; and utilizing the point code to determine that the call intended for the receiving device is a spoof call, wherein the spoof call is initiated by a spoof-calling party associated with a first number and intends to provide an indication to the receiving device that the call is associated with a second number.

In yet another aspect, a method for facilitating incoming spoof call identifications. The method includes receiving an indication that an incoming call intended for a receiving device is a spoof call; and applying a spoof action in association with the incoming call, the spoof action preventing the spoof call or providing an indication that the incoming call is the spoof call.

Figure 2:
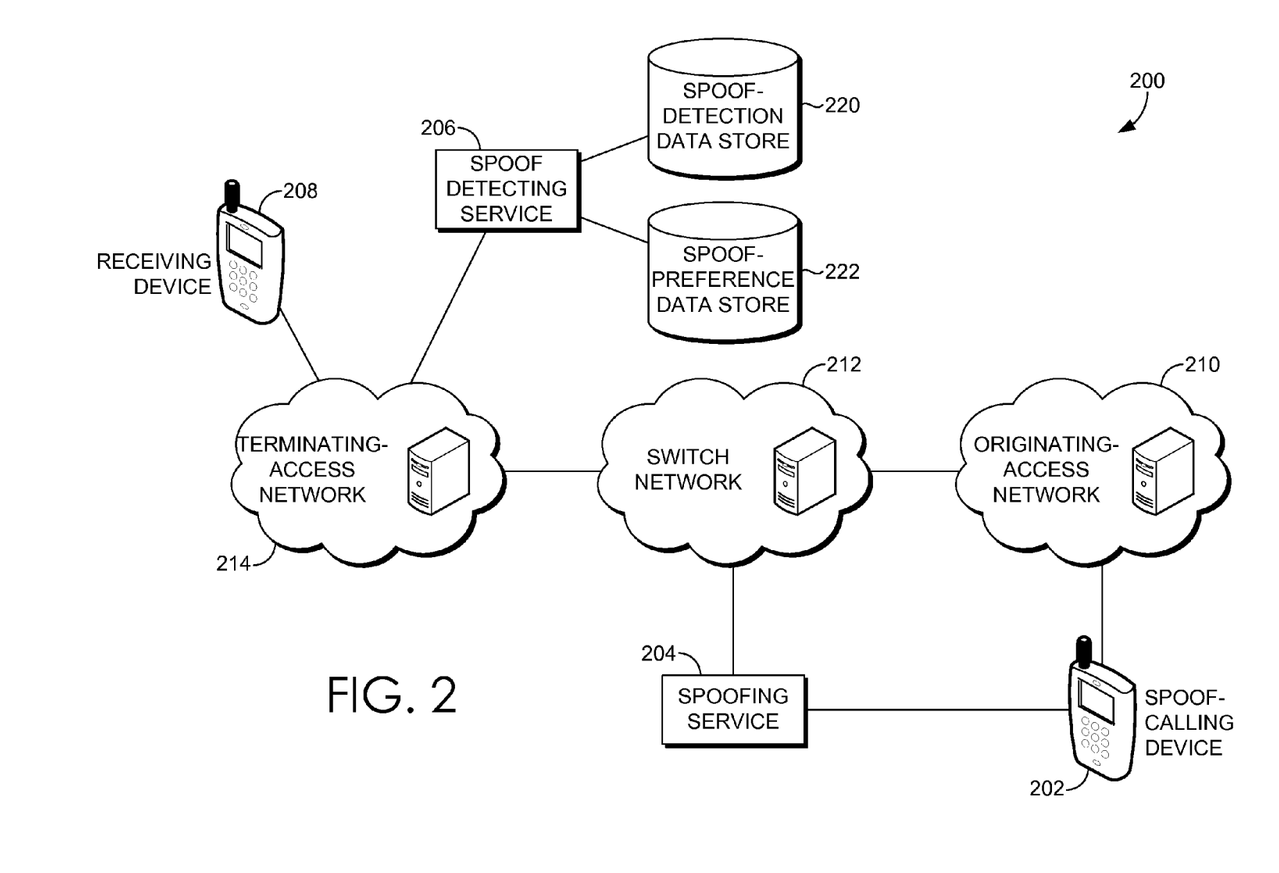
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated. The single unit depictions are meant for clarity, not to limit the scope of embodiments in any form.

As shown in FIG. 2, an exemplary network environment 200 includes a spoof-calling device 202, a spoofing service 204, a spoof detecting service 206, and a receiving device 208. The spoof-calling device 202, the spoofing service 204, the spoof detecting service 206, and/or the receiving device 208 are capable of communicating via a communications network(s), such as originating-access network 210, a switch network 212, and/or a terminating-access network 214. Networks 210, 212, and/or 214 might comprise, for example, a cable network, the Internet, a wireless network (e.g., a wireless telecommunications network), a wireline network, a local exchange carrier (LEC), a PSTN, or a combination thereof or portions thereof. A wireless telecommunications network refers to any type of telecommunications network that is wireless. Examples of a wireless telecommunications technologies that are compatible with the networks 210, 212, and/or 214 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS).

In embodiments, originating-access network 210, switch network 212, and/or terminating-access network 214 include an array of devices, which are not shown so as to not obscure more relevant aspects of the invention. Components such as a base station, a communications tower, or even access points (as well as other components) can provide wireless connectivity in some embodiments. Communications networks 210, 212, and/or 214 may be combined into a single network or can include multiple networks, as well as being a network of networks, but is shown in more simple form so as to not obscure other aspects of the present invention. In this regard, although FIG. 2 illustrates spoof-calling device 202, spoofing service 204, spoof detecting service 206, and/or receiving device 208 communicating with one another via the originating-access network 210, switch network 212, and/or terminating-access network 214, any number of networks can be used (e.g., a single network, a plurality of networks, etc.).

The originating-access network 210, the switch network 212, and the terminating-access network 214 enable communication between the spoof-calling device 202, the spoofing service 204, the spoof detecting service 206, and/or the receiving device 208. The originating-access network 210, as used herein, refers to an access network utilized by the spoof-calling device 202 and/or the spoofing service 204 to place a call. In one embodiment, the originating-access network 210 comprises a wireless telecommunications network provided by a telecommunications network provider, such as, for example, Sprint®, AT&T®, etc. A telecommunications network provider, also known as a carrier, a wireless service provider, a wireless carrier, etc. is a company that provides services for mobile phone users or subscribers. In another embodiment, originating-access network 210 comprises the Internet. In such a case, a calling device, such as a landline computing device, can communicate via an ISP (Internet Service Provider) associated with the Internet. In yet another embodiment, originating-access network 210 comprises a physically wired network, such as a landline, Ethernet, or the like.

The switch network 212 can enable communication between the spoof-calling device 202, the spoofing service 204, the spoof detecting service 206, and/or the receiving device 208. The switch network 212 may include any number of switches that enable communication between devices. In one embodiment, the switch network 212 is a public switched telephone network (PSTN) that allows mobile and fixed telephones to interconnect.

Terminating-access network 214, as used herein, refers to a network utilized by the receiving device 110 to receive a call. In one embodiment, terminating-access network 214 comprises a physically wired network, such as a landline, Ethernet, or the like. For example, the receiving device 208 can utilize terminating-access network 214 to receive a phone call from the calling device 202 and/or the spoofing service 204. In another embodiment, the terminating-access network 214 comprises a wireless telecommunications network provided by a telecommunications network provider, such as, for example, Sprint®, AT&T®, etc. In yet another embodiment, terminating-access network 214 comprises the Internet. In such a case, a receiving device, such as a landline computing device, can communicate via an ISP (Internet Service Provider) associated with the Internet. In embodiments, originating-access network 210 and terminating-access network 214 can be provided by the same telecommunications network provider or different telecommunications network providers. Although single components are illustrated for clarity, networks 210, 212, and/or 214 can enable communication between multiple devices, components, and/or servers.

In the network environment 200, a spoof-calling device 202 may initiate a spoof call to a receiving device 208. The spoof-calling device 202 and/or the receiving device 208 may take on a variety of forms, such as a telephone personal computer (PC), a laptop computer, a tablet, a mobile phone, a personal digital assistant (PDA), a server, or any other device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a spoof-calling device and/or a receiving device comprise a wireless or mobile device with which a wireless telecommunications network is utilized for communication (e.g., voice communication). In this regard, the spoof-calling device communicates with other devices using a wireless telecommunications network(s).

Initially, the spoof-calling device 202 initiates a spoof call via the spoofing service 204. Accordingly, the spoof-calling device 202 communicates with the spoofing service 204 to set up a spoof call intended for the receiving device 208. In this regard, the spoof-calling device 202 requests the spoofing service 204 to set up, or establish a spoof call on behalf of the spoof-calling device. Generally, the spoof-calling party (i.e., the individual or entity initiating the spoof call) and/or the spoof-calling device 202 provides spoof data to the spoofing service 204. Spoof data, as used herein, refers to any data that can be used to set up, initiate, or establish a spoof call. In this regard, the spoof-calling party, or device associated therewith, can provide the spoofing service 204 with the device identifier associated with the spoof-calling device (e.g., a mobile device number (MDN), an IP address, a telephone number, etc.), a device identifier associated with the receiving device that is to receive the spoof call, a spoof number, and/or a spoof name. A device identifier can be any identifier that identifies a device, or set of devices, that is capable of placing calls or that identifies a telephone line. Accordingly, a device identifier can be, for example, a mobile device number, an IP address, a telephone number, etc. A spoof number refers to a number or identifier desired to be displayed via a caller ID associated with the receiving device 208. For example, a spoof number can resemble a phone number intended to be displayed in association with a receiving device such that it appears as though a call was placed from that number. A spoof name refers to a name or value desired to be displayed via a caller ID associated with the receiving device 208. For instance, a spoof name can resemble a name intended to be displayed in association with a receiving device such that it appears as a call being placed from a particular caller. In this regard, a spoof name and/or number provide a false indication of a source of a call.

In one embodiment, to use the spoofing service 204, a spoof-calling party pays for a personal identification number (PIN), which permits spoof calls to be placed. In such an embodiment, the spoof-calling party dials the number provided to them by the spoofing service and enters an appropriate PIN. The spoof-calling party also enters a number he or she wishes to call (i.e., receiving-device identifier) and a number he or she wishes to appear on the caller ID (i.e., a spoof number). In some cases, a spoof name the spoof-calling party intends to have displayed on the caller ID associated with the receiving device can also be provided. In other cases, the name the local phone company has associated with the spoof number is the name that is utilized in association with a spoof call.

In another embodiment, the spoofing service 204 allows the spoof-calling party to initiate spoof calls from a Web-based interface. Using a Web-based spoofing service can include, for example, creating an account with the spoofing service provider. Thereafter, a spoof-calling party can log in to the Website associated with the spoofing service 204 and complete a form. By way of example only, and not limitation, the spoof-calling party can input the device identifier associated with the spoof-calling device (i.e., calling-device identifier), a device identifier associated with the receiving device (i.e., receiving-device identifier) that is to receive the spoof call, a spoof number, and/or a spoof name.

Upon the spoofing service 204 receiving spoof data, the spoofing service 204 can set up or originate the requested spoof call. Accordingly, the spoofing service 204 sets up a first leg and a second leg for a spoof call in association with the spoof-calling device 202 and the receiving device 208. In this regard, the calling-device identifier is dialed and the spoof-calling device 202 called via the switch network 212 and the originating-access network 210. The receiving-device identifier is also dialed, and the receiving device 208 is called via the switch network 212 and the terminating-access network 214. In one embodiment, the spoof-calling device 202 is first called and, when answered, the receiving device 208 is called and the calls can be bridged together. As can be appreciated, from the perspective of the terminating-access network, the incoming spoof call appears to be originated from the spoofing service 204.

As embodiments of the present invention are directed to detecting a spoof call, prior to completing a spoof call to or establishing a spoof call with the receiving device 208, the spoof detecting service 206 is configured to detect whether a call being placed to receiving devices, such as the receiving device 208, is a spoof call. Accordingly, the terminating-access network 214 can provide call-setup data to the spoof detecting service 206. As can be appreciated, in one embodiment, the spoof detecting service 206 is associated with the terminating-access network 214, or another network. In another embodiment, the spoof detecting service 206 is associated with a third-party remote from the terminating-access network 214. In this regard, a third-party to a network, such as the terminating-access network 214, can provide spoof call detection services.

Call-setup data can be provided by the terminating-access network 214 to the spoof detecting service 206. In implementation, the terminating-access network 214 may obtain such data, for instance, via the switch network 212, the originating-access network 210, the spoofing service 204, the spoof-calling device 202, and/or the like. In one embodiment, for each call received by a terminating-access network, such as terminating-access network 214, call-setup data can be provided to the spoof detecting service 206 such that a determination can be made as to whether an incoming call is a spoof call. In another embodiment, a spoof call determination might only be made for a portion of calls received by a terminating-access network. For example, a spoof call determination may be made in association with calls incoming to devices that are registered for spoof call detection services. For instance, a user of a receiving device might register or subscribe to spoof call detection services, for instance, via the wireless carrier that provides services to the receiving device. As can be appreciated, in some cases, call-setup data might be provided to spoof detecting service 206 regardless of whether the receiving device is registered for spoof detection services. For example, call-setup data can be provided to spoof detecting service 206 such that the spoof detecting service 206 can analyze the data and detect potential spoofing services. In this regard, spoofing services can be recorded and subsequently utilized to identify a spoof call (e.g., a point code associated with the spoofing service can be included within a white or black list).

Call-setup data refers to any data that can be used to setup a call between devices. Such call-setup data, or a portion thereof, is utilized to detect whether an incoming call is a spoof call. By way of example only, and without limitation, call-setup data might be a calling-device identifier, a receiving-device identifier, a mobile station ID (MSID), a carrier identifier, a point code(s), a spoof number, a spoof name, a combination thereof, or the like. A point code or SS7 point code refers to a unique address for a node (e.g., signaling point). A point code may refer to an originating point code or a destination point code. In some cases, a point code identifies a destination of a message signal unit (MSU). A point code can be various lengths, for example, 24 bits, 16 bits, 14 bits, etc. In this regard, point codes can provide an indication of a route of a phone call, or a portion thereof.

In some cases, the spoof detecting service 206 may utilize call-setup data in association with spoof-detection data to identify or detect whether an incoming call is a spoof call. Spoof-detection data, as used herein, refers to any data that can be utilized to identify if a call is a spoof call. As illustrated in FIG. 2, spoof-detection data can be stored in a data store 220, for example, in association with the spoof detecting service 206.

In one embodiment, the spoof detecting service 206 can utilize spoof-detection data comprising a white and/or black list that indicates whether a call is a spoof call. Spoof-detection data included in a white list indicates that the call is not associated with a spoof call. On the other hand, spoof-detection data included in a black list indicates that the call is associated with a spoof call. As can be appreciated, in some embodiments, a single list is utilized that includes the black list and the white list, or indications thereof.

In such an embodiment, the spoof detecting service 206 may utilize a lookup system to determine if any received call-setup data corresponds with or matches spoof-detection data indicating whether such data is associated with a white list or a black list. By way of example, a point code corresponding with a phone call placed by a spoofing service can be utilized in association with spoof-detecting data that indicates point codes associated with white and/or black lists. In this regard, a point code corresponding with a specific incoming call can be referenced and, thereafter, determined if the particular point code is associated with a white or black list. If the point code is included in a white list, the incoming call is not identified as a spoof call (i.e., a non-spoof call). On the other hand, if the point code is included in a black list, the incoming call is identified as a spoof call.

Alternatively or additionally, the spoof detecting service 206 may utilize other spoof-detection data to determine whether an incoming call is a spoof call. In one example, the spoof-detection data store 220 might contain a listing of each registered point code and an entity associated therewith (e.g., owner such as a carrier). In such a case, a point code associated with an incoming call can be used to recognize if the point code is associated with a trusted source (e.g., a mobile carrier, etc.). If so, the incoming call can be designated as a trusted call. In such a case, the point code might be added to a white list. If not, the incoming call can be designated as a spoof call. In such a case, the point code might be added to a black list. In implementation, a point code received within the call-setup data can be utilized to reference an entity associated therewith, such as an owner of the point code. If the associated entity is deemed to be or designated as a trusted entity, the call can be designated as a non-spoof call. If the associated entity is deemed to be or designated as an unknown entity or an untrusted entity, the call might be designated as a possible spoof call or a spoof call.

In another example, spoof-detection data within a routing guide can be accessed to determine whether an incoming call is a spoof call. A routing guide, such as a LERG routing guide, includes data to support routing of calls by service providers. A routing guide may include, for example, operating company numbers, company names, routing contacts, country code assignments, number plan area (NPA) assignments (e.g., area codes), local access and transport area codes, destination code assignments (NPA NXX), access tandem codes, switch entity record detail, rate center details, location routing numbers, a mobile station ID (MSID), etc. A mobile station ID uniquely identifies a mobile unit within a wireless carrier's network.

In this way, call-setup data can be compared to data within a routing guide to determine if an incoming call is a spoof call. For example, a spoof number, or a portion thereof (e.g., NPA/NXX), can be utilized in association with data within a routing guide to determine whether an incoming call is a spoof call. For instance, assume that call-setup data is received that includes a spoof number, or a portion thereof, and at least one point code. Upon receiving the spoof number, such a number or a portion thereof (e.g., NPA/NXX), can be referenced to identify a corresponding owner (e.g., carrier) and/or location associated therewith. Further, an owner and/or location associated with the point code can also be referenced and compared to the owner and/or location associated with the spoof number. Upon comparing such data, a conflict in the data may indicate a spoof call or a possible spoof call.

By way of example only, assume that a number received at the spoof detecting service 206 is 816.555.5555. Such a number, or a portion thereof (e.g., 816.555) can be referenced to identify an owner of the number and/or an area associated with the number. Further, a point code associated with the origination of the call can be referenced to identify an owner and/or area associated with the point code. In one example, assume that AT&T® is identified as the carrier associated with the number 816.555.5555 and that such a number is associated with the a first geographical area or region. Further assume that the owner of the point code and the area associated with the point code are AT&T and the first geographical region, respectively. In this example, it can be determined that the instant phone call is not a spoof call as the owner and geographical area associated with the point code and the number correspond with one another.

Now assume that the owner of the point code associated with origination of the phone call and the area associated with the point code are ABC and a second geographical area, respectively. In such a case, a determination might be made that the instant phone call is likely a spoof call as the owner and geographical area associated with the point code (i.e., ABC and second geographical area, respectively) are different from the owner and geographical area associated with the number (i.e., AT&T® and first geographical region, respectively). Accordingly, the incoming call be recognized as a spoof call. In some cases, a point code associated with a spoof call can be recorded as such and, thereafter, utilized to identify spoof calls. For example, a point code associated with a spoof call might be designated or flagged in a black list as a point code at which spoof calls are originate.

Upon determining that an incoming call is a spoof call, the spoof detecting service 206 can provide an indication, for example, to the terminating-access network 214 and/or the receiving device 208, that the instant call is a spoof call or likely a spoof call. In this regard, a spoof-call indication can be provided. A spoof-call indication provides an indication that a call is a spoof call or might be a spoof call.

In addition to or in the alternative to providing a spoof-call indication associated with an incoming call, the spoof detecting service 206 can identify a spoof action to apply in connection with the initiated spoof call. A spoof action refers to an action to apply in association with a spoof call or possible spoof call. By way of example and not limitation, a spoof action might be to block transmission of the spoof call to the receiving device, transfer the spoof call directly to voicemail, send a text message indicating a spoof call, provide an indication within the caller ID to indicate a spoof call, a unique phone ring to indicate a spoof call, and/or the like.

In some implementations, the spoof detecting service 206 might provide spoof actions based on a default setup. For example, any calls definitely identified as a spoof call might be blocked or sent directly to voicemail while any calls identified as a possible spoof call may be provided to the receiving device along with a spoof notice (e.g., a symbol provided in the caller ID, a unique phone ring, a text message, etc.).

In other implementations, a spoof-preference data store 222 that stores user preferences for spoof actions might be referenced to identify which, if any, spoof action to apply for a specific incoming call. For example, one user might prefer that any possible spoof calls are transferred directly to voicemail, while another user of a receiving device might prefer that definite spoof calls are blocked and possible spoof calls are provided along with a warning notice to the user of the receiving device. Other examples of user preferences concerning spoof actions include from a particular destination (e.g., point code(s)), always route calls straight to voice mail; from a particular destination, always block alerting to the called parties mobile and provide secondary treatment at the carriers switch e.g., fast busy to the calling party; from a particular destination, provide a notification for suspicious incoming call on the device screen, etc.

As can be appreciated, a spoof indication to indicate a spoof call and/or spoof action to apply in association with a spoof call might be provided directly from the spoof detecting service 206 to the receiving device 208. In other embodiments, a spoof indication and/or spoof action might be provided from the spoof detecting service 206 to the terminating-access network 214, such that the terminating-access network 214 can, for example, apply, effectuate, or communicate the spoof action. For example, the terminating-access network 214 can apply a spoof action by blocking the call, facilitating directing the call to voicemail, or providing a spoof notification to the receiving device indicating a spoof call or a possible spoof call.

The spoof detecting service 206 may also be configured to alert a user who's credentials were being used to spoof a receiving party. For example, assume that a spoof-calling party uses a device identifier (e.g., mobile device number) and/or a caller name belonging to another owner (e.g., individual or entity). In such a case, the owner of the number and/or name used by a spoof-calling party can be alerted as to usage of its device identifier and/or caller name. As can be appreciated, any manner can be utilized to alert a user of usage of the entity's credentials, for example, via a telephone network using voice calls or text, via an Internet network using a web-based service or an application, etc.

Upon the terminating-access network 214 receiving an indication of a spoof call and/or a spoof action, the terminating-access network 214 can initiate, effectuate, or apply an appropriate spoof action. Accordingly, the terminating-access network 214 might be used to block the suspected spoof call, transfer the call to voicemail of the receiving device, provide a notice of the suspected spoof call to the receiving device 208, etc.

In some cases, the receiving device 208 can effectuate an appropriate spoof action. For example, the terminating-access network 214 and/or the spoof detecting service 206 can notify the receiving device 208 of the possible spoof call and an application residing on the receiving device can apply a spoof action, such as a spoof action selected by the receiving device or received from the terminating-access network 214 and/or the spoof detecting service 206.

In some embodiments, the receiving device 208 can be configured to facilitate reporting spoof activity. In this regard, upon receiving a spoof notice, a user of the receiving device 208 can confirm or verify that the instant call was indeed a spoof call or, alternatively, can refute that the instant call was a spoof call (i.e., identify false positives). In other cases, notwithstanding reception of a spoof notice, a user of a receiving device may be permitted to report spoof activity. For instance, upon receiving a spoof call, the user of the receiving device 208 can provide information to the spoof detecting service 206 to indicate that a spoof call was received. Reporting spoof activities can be performed using any manner, such as, for example, through an application of the receiving device, a web-based interface, a text message, a phone call, and/or the like.

As can be appreciated, while embodiments herein describe the terminating-access network 214, the switch network 212, and/or the originating-access network 210, a component or components thereof (e.g., a server or network of servers) can be performing the functionality described herein.

Turning now to FIGS. 3-6, exemplary methods for implementing embodiments of the present invention are provided. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 3:
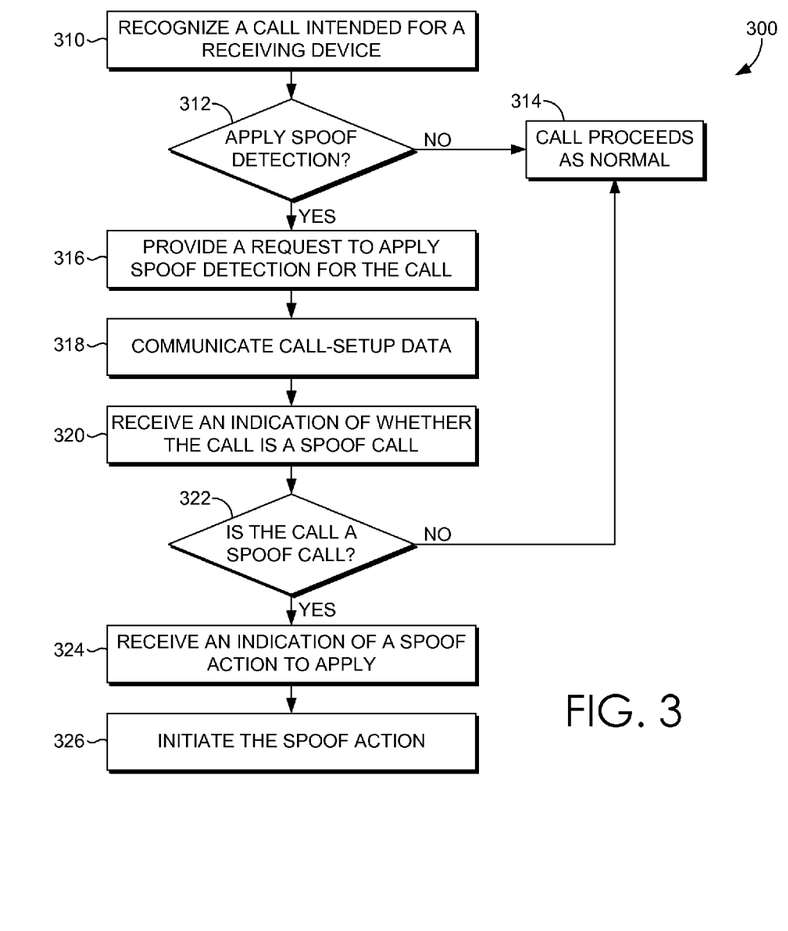
FIG. 3 provides a first exemplary method for facilitating detection of incoming spoof calls, in accordance with an embodiment of the present invention.

FIG. 3 illustrates an exemplary method 300 for facilitating detection of incoming spoof calls and is generally depicted by numeral 300. More specifically, the method 300 is one example of implementation for initiating detection of incoming spoof calls. The method 300 is described in the context of the terminating-access network 214 of FIG. 2 for ease of illustration, but is not limited to being performed in such a context.

Initially, at block 310, a call intended for a receiving device associated with a network is recognized. Such a network might be a wireless carrier network associated with a mobile receiving device. At block 312, it is determined if spoof call detection applies to the receiving device. In this regard, receiving devices, or users associated therewith, might be registered for spoof call detection. Such a determination might be made, for example, upon accessing a data store indicating devices or device identifiers for which spoof call detection is to apply. In other cases, spoof call detection may apply for each call.

If spoof call detection does not apply, the call proceeds normally, as indicated at block 314. In some cases, call-setup data might be passed on to the spoof detecting service 206 even if spoof call detection does not apply such that the spoof detecting service can analyze the data and detect potential spoofing services (e.g., point codes associated with potential spoofing services). On the other hand, if spoof call detection does apply, a request to apply spoof detection for the call is provided to the spoof detecting service. This is indicated at block 316. At block 318, call-setup data is communicated to the spoof detecting service such that a determination of whether an instant call is a spoof call can be made. In embodiments, such call-setup data might be received, for example, for a spoof-calling device, a spoofing service, an initiation-access network, a switch network, and/or the like. Subsequently, at block 320, an indication of whether the call is a spoof call is received.

It is identified at block 322 whether the call is a spoof call or a non-spoof call. If the instant call is designated as a non-spoof call, the call proceeds normally, as indicated at block 314. If, however, the instant call is designated as a spoof call, an indication of a spoof action to apply is received. This is indicated at block 324. In some embodiments, the spoof action to apply can be identified via the terminating-access network. At block 326, the spoof action is initiated. By way of example, if the spoof action is to block the call, a blocked call can be initiated. As another example, assume that the spoof action is to transfer the call directly to voicemail. In such a case, the call can be directed to voicemail. As can be appreciated, in some embodiments, the indication of the spoof action can be communicated on to the receiving device such that the receiving device can effectuate or facilitate application of the action (e.g., block the call, send the call to voice mail, provide a notification).

Figure 4:
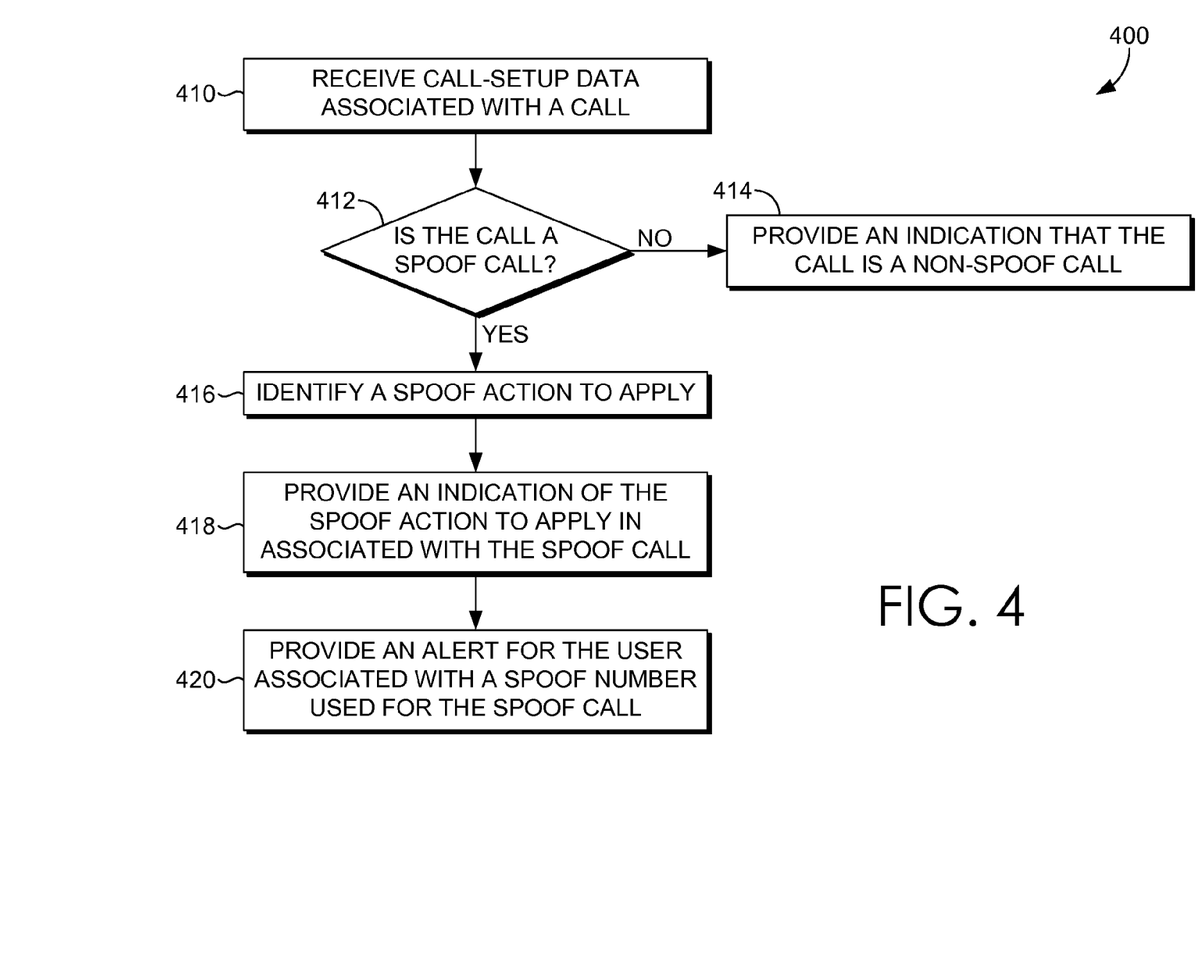
FIG. 4 provides a second exemplary method for facilitating detection of incoming spoof calls, in accordance with an embodiment of the present invention.

FIG. 4 illustrates another exemplary method 400 for facilitating detection of incoming spoof calls and is generally depicted by numeral 400. More specifically, the method 400 is one example of implementation for detecting incoming spoof calls. The method 400 is described in the context of the spoof detecting service 206 of FIG. 2 for ease of illustration, but is not limited to being performed in such a context.

Initially, as indicated at block 410, call-setup data associated with a call is received. Such call-setup data can be received via a terminating-access network. At block 412, it is determined if a call is a spoof call. In embodiments, call-setup data is used to identify whether an instant call is a spoof call. If it is determined that a call is not a spoof call, an indication that the call is a non-spoof call is provided, for example, to a terminating-access network and/or a receiving device. This is indicated at block 414. In some cases, a point code associated with a non-spoof call can be recorded, for example, in a white list to be used for future reference in identifying spoof calls.

On the other hand, if it is determined that a call is a spoof call, a spoof action to apply is identified, as indicated at block 416. In such a case, a data store of user preferences can be referenced and utilized to identify a spoof action to apply in accordance with the call. At block 418, an indication of the spoof action to apply in association with the spoof call is provided. Such an indication might be provided to, for example, a terminating-access network and/or a receiving device. At block 420, an alert is provided for the user associated with a spoof number used for the spoof call. In this regard, a user associated with the spoof number may be identified and, thereafter, notified of possible misuse of the entity's credentials.

Figure 5:
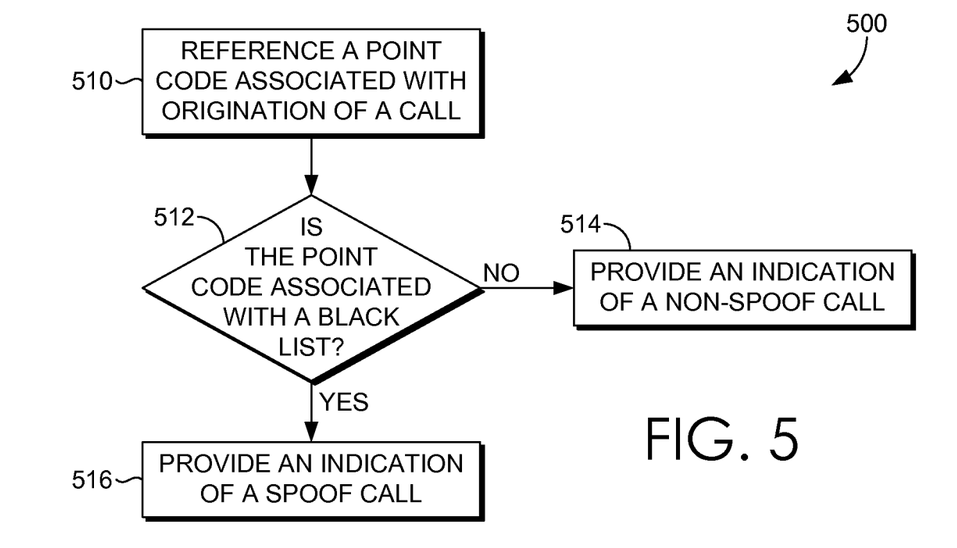
FIG. 5 provides a third exemplary method for facilitating detection of incoming spoof calls, in accordance with an embodiment of the present invention.

FIG. 5 illustrates another exemplary method 500 for facilitating detection of incoming spoof calls and is generally depicted by numeral 500. More specifically, the method 500 is one example of implementation for detecting incoming spoof calls. The method 500 is described in the context of the spoof detecting service 206 of FIG. 2 for ease of illustration, but is not limited to being performed in such a context.

Initially, as indicated at block 510, a point code associated with origination of a call is referenced. In embodiments, a spoof call originates in association with the spoofing service, in accordance with a user of a user device initiating a spoof call. A non-spoof call can originate in association with the user device initiating the call. Such a point code can be received in connection with call-setup data. At block 512, it is determined if the point code is associated with a black list. If not, an indication of a non-spoof call is provided, at indicated at block 514. If so, an indication of a spoof call is provided, as indicated at block 516.

Figure 6:
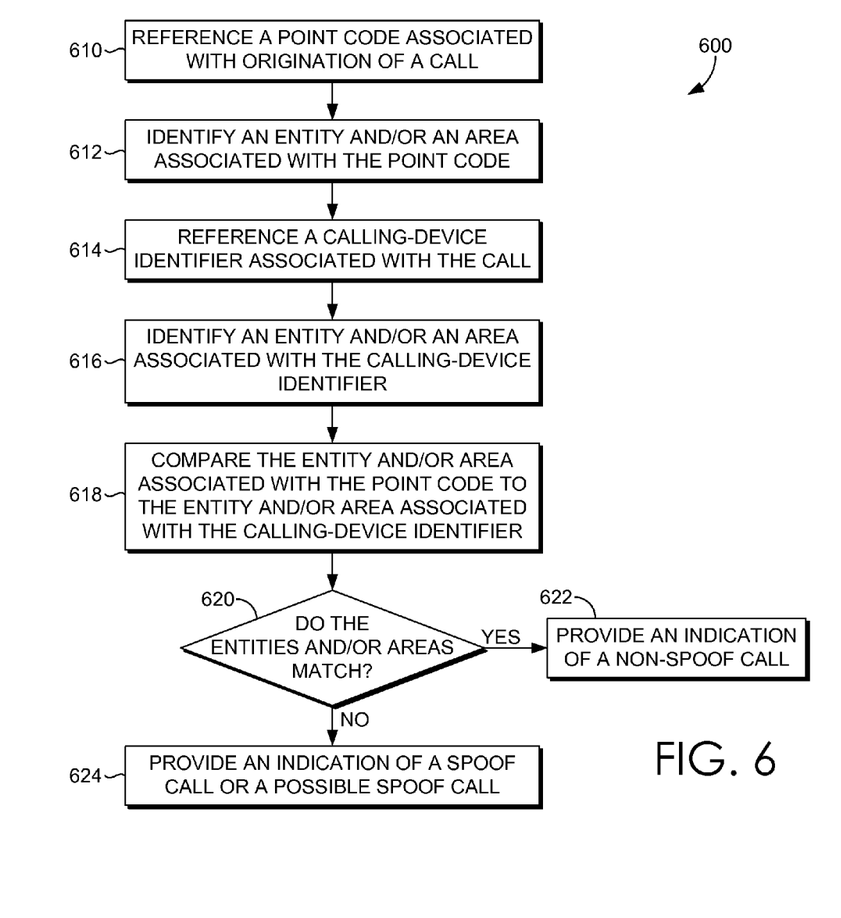
FIG. 6 provides a fourth exemplary method for facilitating detection of incoming spoof calls, in accordance with an embodiment of the present invention.

FIG. 6 illustrates another exemplary method 600 for facilitating detection of incoming spoof calls and is generally depicted by numeral 600. More specifically, the method 600 is one example of implementation for detecting incoming spoof calls. The method 600 is described in the context of the spoof detecting service 206 of FIG. 2 for ease of illustration, but is not limited to being performed in such a context.

Initially, as indicated at block 610, a point code associated with origination of a call is referenced. Such a point code can be received in connection with call-setup data. In embodiments, a spoof call originates in association with the spoofing service, in accordance with a user of a user device initiating a spoof call. A non-spoof call can originate in association with the user device initiating the call. At block 612, an entity and/or geographical area associated with the point code is identified. At block 614, a calling-device identifier associated with a call is identified. Such a calling-device identifier might be, for example, a phone number such as a spoof number or a legitimate number of a device. At block 616, an entity and/or geographical area associated with the calling-device identifier is identified. Subsequently, at block 618, the entity and/or geographical area associated with the point code is compared with the entity and/or geographical area associated with the calling-device identifier. It is determined at block 620 whether the entities and/or geographical areas match or correspond with one another. If so, an indication of a non-spoof call is provided at block 622. If not, an indication of a spoof call or a possible spoof call is provided, as indicated at block 624.

Figure 7:
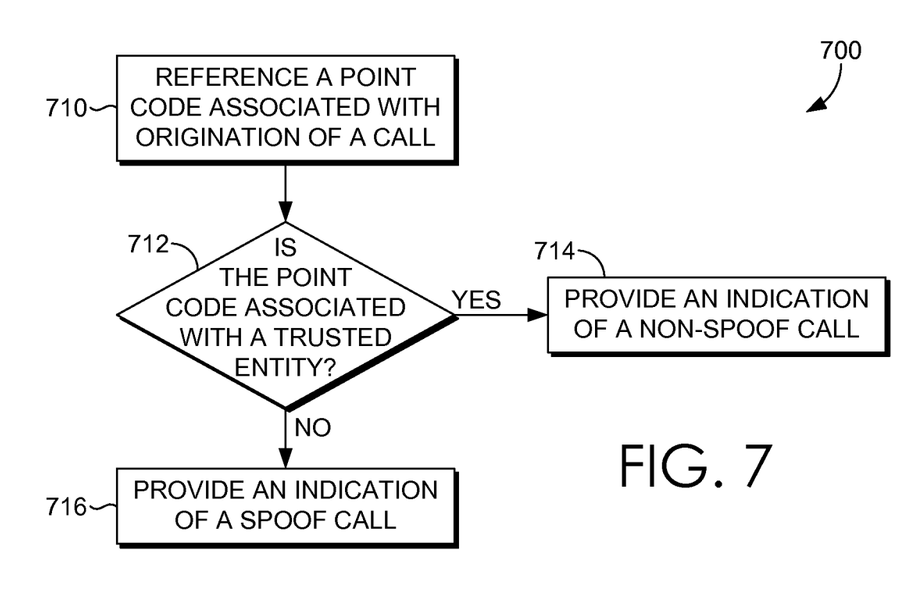
FIG. 7 provides a fifth exemplary method for facilitating detection of incoming spoof calls, in accordance with an embodiment of the present invention.

FIG. 7 illustrates another exemplary method 700 for facilitating detection of incoming spoof calls and is generally depicted by numeral 700. More specifically, the method 700 is one example of implementation for detecting incoming spoof calls. The method 700 is described in the context of the spoof detecting service 206 of FIG. 2 for ease of illustration, but is not limited to being performed in such a context.

Initially, as indicated at block 710, a point code associated with origination of a call is referenced. Such a point code can be received in connection with call-setup data. In embodiments, a spoof call originates in association with the spoofing service, in accordance with a user of a user device initiating a spoof call. A non-spoof call can originate in association with the user device initiating the call. At block 712, it is determined if the point code is associated with a trusted entity. If not, an indication of a non-spoof call is provided, as indicated at block 714. If so, an indication of a spoof call is provided, as indicated at block 716.

Figure 8:
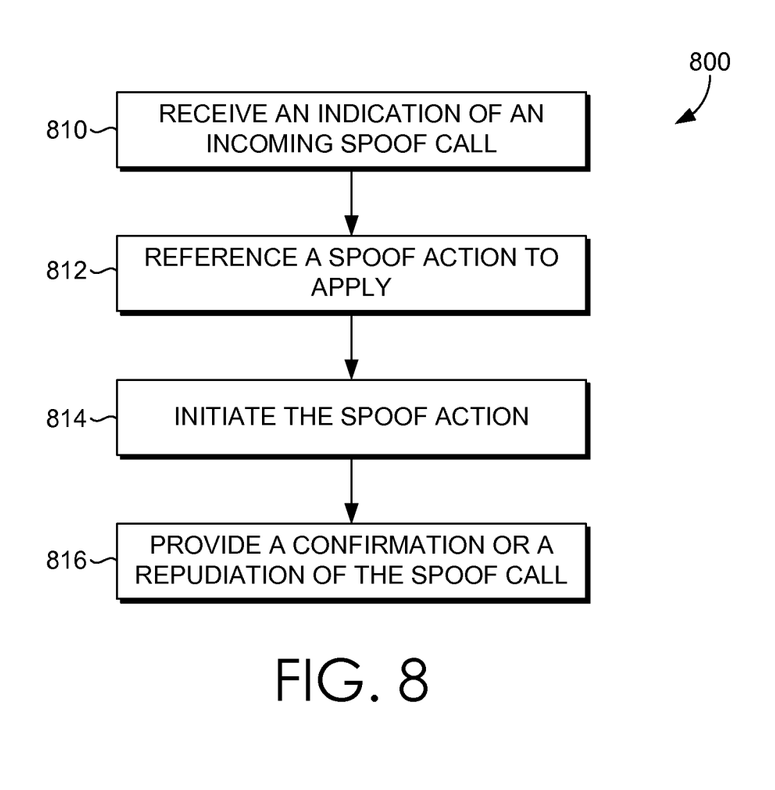
FIG. 8 provides an exemplary method for facilitating identification of incoming spoof calls, in accordance with an embodiment of the present invention.

FIG. 8 illustrates another exemplary method 800 for facilitating identification of incoming spoof calls and is generally depicted by numeral 800. More specifically, the method 800 is one example of implementation for providing a notice of a spoof call. The method 800 is described in the context of the receiving device 208 of FIG. 2 for ease of illustration, but is not limited to being performed in such a context.

Initially, as indicated at block 810, an indication of an incoming spoof call is received. Such an indication can be provided from, for example, a spoof detecting service and/or a terminating-access network. At block 812, a spoof action to apply is referenced. As can be appreciated, in some cases, the spoof action can provide the indication of the incoming spoof call. A spoof action can be received or identified via the receiving device. At block 814, the spoof action is initiated. For example, assume the spoof action to apply is to send a call to voicemail. In such a case, the incoming call can be directed to voicemail. By way of another example, assume the spoof action to apply is to provide a notice to the user of the receiving device of a spoof call or a possible spoof call. In such a case, a spoof notice can be provided by way of the receiving device. For instance, a unique ring tone may be applied, a symbol or other indicator can be provided in the caller ID, etc. At block 816, a confirmation or a repudiation of the spoof call can be provided. In this regard, a user might confirm or reject that the incoming call was a spoof call. Such a confirmation or repudiation can be provided, for example, to the spoof detecting service via an application on the receiving device, a web-based interface, etc.

It will be understood by those of ordinary skill in the art that the order of steps shown in the method 300 of FIG. 3, method 400 of FIG. 4, method 500 of FIG. 5, method 600 of FIG. 6, method 700 of FIG. 7, and method 800 of FIG. 8 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating incoming spoof call determinations, the method comprising:
   receiving call-setup data including a point code associated with origination of a call intended for a receiving device; and
   utilizing the point code to determine that the call intended for the receiving device is a spoof call, wherein the spoof call is initiated by a spoof-calling party associated with a first number and intends to provide an indication to the receiving device that the call is associated with a second number, wherein the determination that the call intended for the receiving device is a spoof call is made based on the point code being associated with a black list that includes a set of point codes associated with spoofing services.

2. The media of claim 1 further comprising providing an indication of the spoof call.

3. The media of claim 1 further comprising:
   identifying a spoof action to apply in accordance with the spoof call; and
   providing an indication of the spoof action to apply.

4. One or more non-transitory computer-readable storage media having computer-executable instructions embodied thereon that, when executed, perform a method for facilitating incoming spoof call determinations, the method comprising:
   receiving call-setup data including a point code associated with origination of a call intended for a receiving device; and
   utilizing the point code to determine that the call intended for the receiving device is a spoof call, wherein the spoof call is initiated by a spoof-calling party associated with a first number and intends to provide an indication to the receiving device that the call is associated with a second number, wherein the determination that the call intended for the receiving device is a spoof call is made based on an entity associated with the point code being different from an entity associated with a spoof number of the spoof call.

5. The media of claim 4 further comprising providing an indication of the spoof call.

6. The media of claim 4 further comprising:
   identifying a spoof action to apply in accordance with the spoof call; and
   providing an indication of the spoof action to apply.

7. A method for facilitating incoming spoof call determinations, the method comprising:
   receiving call-setup data including a point code associated with origination of a call intended for a receiving device; and
   utilizing the point code to determine, via a computing device, that the call intended for the receiving device is a spoof call, wherein the spoof call is initiated by a spoof-calling party associated with a first number and intends to provide an indication to the receiving device that the call is associated with a second number, wherein the determination that the call intended for the receiving device is a spoof call is made based on an entity associated with the point code being different from an entity associated with a spoof number of the spoof call.

8. The method of claim 7 further comprising providing an indication of the spoof call.

9. The method of claim 7 further comprising:
   identifying a spoof action to apply in accordance with the spoof call; and
   providing an indication of the spoof action to apply.

* * * * *